March 10, 1936.  H. P. MANLY  2,033,347
SHORT CIRCUIT DETECTOR
Filed July 14, 1934
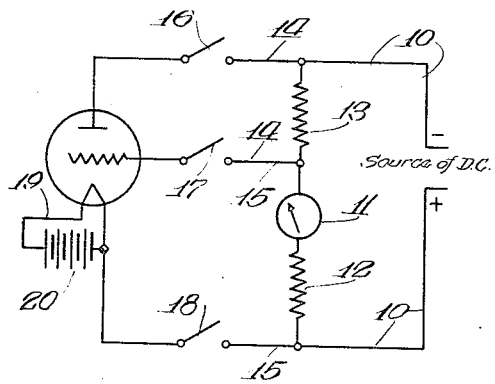
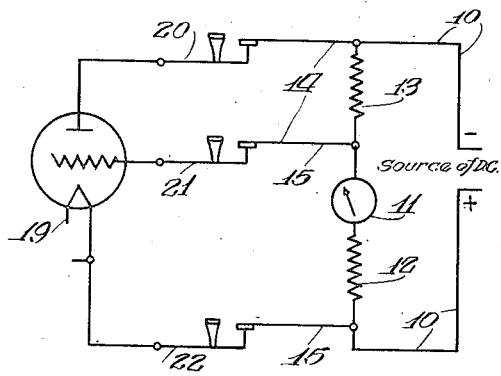
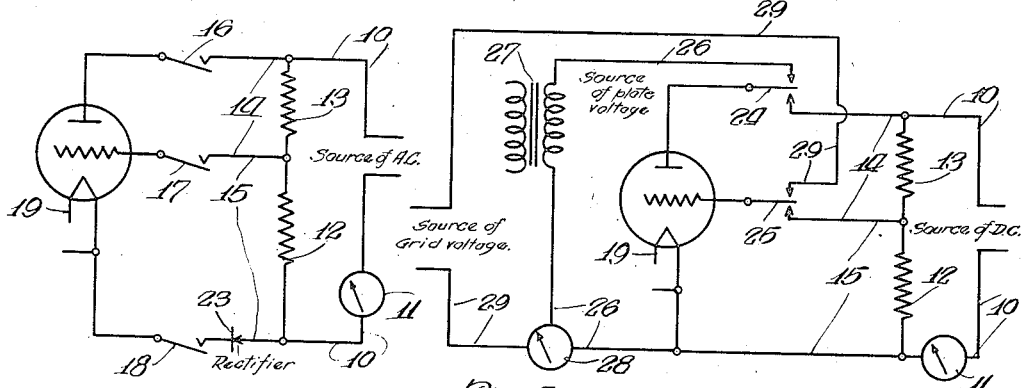
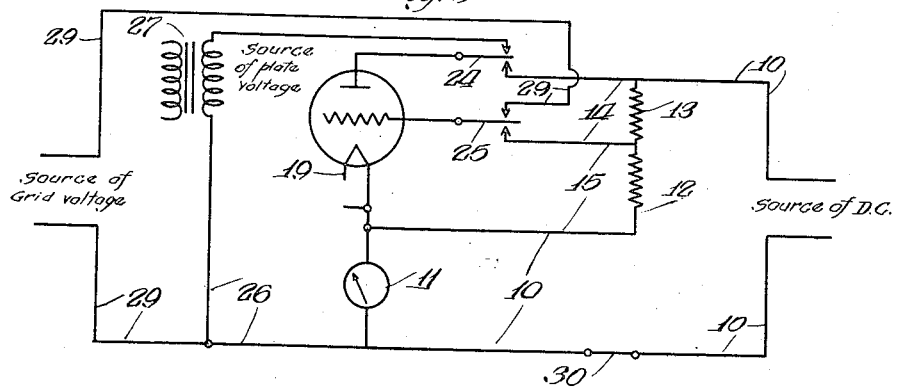
Inventor:
Harold P. Manly.
By: Brayton Richards
Attorney.

Patented Mar. 10, 1936

2,033,347

UNITED STATES PATENT OFFICE 2,033,347

SHORT CIRCUIT DETECTOR

Harold P. Manly, Wilmette, Ill.

Application July 14, 1934, Serial No. 735,233

6 Claims. (Cl. 250—27)

The invention relates to improvements in apparatus for detecting short circuits in electronic tubes and has for its object the provision of a simple apparatus of the character indicated which is capable of economical production and is highly efficient in use.

Another object of the invention is the provision of a simple apparatus of the character indicated especially adapted for use in testing thermionic radio tubes.

Another object of the invention is the provision of apparatus of the character indicated which is capable of use in testing such tubes under substantially normal conditions of use and without disturbance or interference from such conditions.

Other objects will appear hereinafter.

The invention consists in the combinations and arrangements of parts hereinafter described and claimed.

The invention will be best understood by reference to the accompanying drawing forming a part of this specification and in which:

Fig. 1 is a diagrammatic view of a simple form of apparatus embodying the invention and shown in condition for testing an ordinary thermionic radio tube;

Fig. 2, a similar view of a similar but slightly modified form of such apparatus;

Fig. 3, a similar view showing the apparatus as in use with an alternating current as the testing current;

Fig. 4, a similar view showing a modified form of application of the invention whereby the same may be incorporated in apparatus for performing other tests on the tube; and Fig. 5, a view similar to Fig. 4, but showing how a single indicator may be advantageously employed instead of the two indicators shown in Fig. 4.

The embodiment of the invention illustrated in Fig. 1 comprises a testing circuit 10 including a source of direct current, an indicator 11, and two resistance coils 12 and 13 which serve, as will be readily understood, as impediments or limitations to the normal flow in the testing circuit, as will be readily understood by those skilled in the art. Co-operating with the testing circuit 10 are two branch circuits 14 and 15, the branch circuit 14 including the resistance coil 13 and the plate and grid of the thermionic tube to be tested as shown. The branch circuit 15 includes the resistance coil 12 and the grid and cathode or filament of the tube being tested, as shown. Switches 16, 17 and 18 are included as shown in circuits 14 and 15 and whereby either or both of said branch circuits may be opened or closed as desired. A heating circuit 19 including the tube cathode and a battery 20 is arranged as indicated for heating the cathode of the tube substantially to its normal operating temperature.

The tube to be tested is inserted in the circuits 14, 15 and 19 as indicated, the switches 16, 17 and 18 being left open and a source of direct current supplied to the circuit 10. A current will flow in the circuit 10 entirely independently of the branch circuits 14 and 15 and controlled only by the resistance or other impediments to current flow directly incorporated in said circuit 10. This current flow may be read on the indicator 11 and a note made thereof. If there is any short circuit in the tube being tested, the closing of switches 16, 17 and 18 will cause change in the reading of the indicator 11. Thus, if switches 16 and 17 are closed, and there should exist a short circuit between the tube plate and the grid, this short circuit will complete and close the branch circuit 14, thereby establishing a circuit in parallel with the resistance coil 13 and affording a path for current around said resistance coil, such parallel path of current thereby materially reducing the total effective resistance in the circuit 10, causing an increase of current flow therein and thereby a change in the reading of the indicator 11. If switches 17 and 18 are closed, with switch 16 open, if there is a short circuit between the tube cathode and grid, a parallel circuit will be provided around both the resistance coil 12 and the indicator 11, thereby materially decreasing the flow of current through the indicator so that such change of reading of the indicator will show a short circuit between the cathode and grid of the tube. If switches 16 and 18 are closed while switch 17 is left open, any short circuit between the cathode and plate of the tube will form a parallel circuit with reference to both resistance coils 12 and 13 and the indicator 11, thereby materially decreasing the flow of current through the indicator and thus showing such short circuit.

If all three of the switches 16, 17 and 18 are closed and there is any change in current flow indicated by the indicator 11, this will show that there is some short circuit defect in the tube and the above tests may then be performed to locate where the short circuit is if such specific location is desired. By this arrangement it will be noted that the tube cathode or filament is heated and at the same time maintained positive with reference to the other electrodes, or conversely, the other electrodes are maintained negative with reference to the heated cathode. As a heated cathode in a thermionic tube will carry an electronic current only when it is negative with reference to one or more of the other electrodes, or conversely, when one or more of the other electrodes is positive with reference to the cathode, this arrangement will effectively prevent any electronic flow through the tube during the test, and thereby prevent interference with the accuracy of said test due to normal electronic flow in the tube.

The modification illustrated in Fig. 2 is precisely the same as that illustrated in Fig. 1 except that spring-held switches 20, 21 and 22 are provided in the branch circuits 14 and 15 whereby said branch circuits will be held normally closed and the tests will be performed by simply operating one or all of said switches to open said branch circuits. Obviously, any change of current flow caused by opening any one or all of said switches, will indicate that there is some kind of a short circuit in the tube. If desired, the specific location of such short circuit may be then determined by successively opening the different switches.

The modified arrangement illustrated in Fig. 3 is such that an alternating current may be used in the testing circuit 10. For this purpose a rectifier 23 is inserted as indicated in the branch circuit 15 and will thus serve to maintain the tube cathode constantly positive with reference to the other electrode so as to prevent any electronic flow through the tube during the various tests.

In this case also, any change in the current flow in the testing circuit 10 caused by the opening or closing of any of the switches 16, 17 and 18 will indicate that there is a short circuit in the tube and the location of such short circuit may be determined, if desired, as above.

In the modification illustrated in Fig. 4, two-throw switches 24 and 25 are arranged in the branch circuits 14 and 15 as shown. A plate circuit 26 is arranged as shown to be opened and closed by the switch 24 and includes a source of plate voltage 27 and another current indicator 28. A grid circuit 29 is also arranged to be opened and closed by the switch 25 and includes also a source of grid voltage and the indicator 28. By this arrangement when the switches 24 and 25 are manipulated to open and close the branch circuits 14 and 15, the tube may be tested just as in the apparatus illustrated in Fig. 1. When the switches 24 and 25 are manipulated to close the circuits 26 and 29, said circuits may be utilized for testing the qualities of the tube in other respects, the indicator 28 serving to indicate conditions in circuits 26 and 29, as will be readily understood by those skilled in this art.

The modification illustrated in Fig. 5 is the same as that illustrated in Fig. 4 except that the indicator 11 is moved into the cathode connection so as to serve as a common indicator for all the circuits, thus dispensing with the necessity of employing two indicators as illustrated in Fig. 4. Otherwise the arrangement is the same as that illustrated in Fig. 4 except that a supplemental switch 30 is provided in circuit 10 so that circuit 10 may be opened when the circuits 26 and 29 are being utilized.

By this arrangement a short circuit detector may be incorporated with other usual and normal testing circuits for the tube without undue or material modification of parts.

While I have illustrated and described the preferred forms of construction for carrying the invention into effect, these are capable of wide variation and modification without departing from the spirit of the invention. I, therefore, do not wish to be limited to the precise details disclosed but desire to avail myself of such variations and modifications as fall within the scope of the appended claims.

I claim:

1. A short circuit detector for thermionic tubes comprising means for heating the tube cathode; a testing circuit including a source of suitable current, a plurality of impediments to current flow and an indicator; means for establishing a branch circuit in parallel with each of said impediments and including two of the tube electrodes; and means for preventing electronic flow between said electrodes.

2. A short circuit detector for thermionic tubes comprising means for heating the tube cathode; a testing circuit including a source of suitable current, a plurality of impediments to current flow and an indicator; means for establishing a branch circuit in parallel with each of said impediments and including two of the tube electrodes; and means for maintaining the tube cathode positive with reference to the other electrodes and thereby preventing electronic flow between said electrodes.

3. A short circuit detector for thermionic tubes comprising means for heating the tube cathode; a testing circuit including a source of suitable current, a plurality of impediments to current flow and an indicator; means for establishing a branch circuit in parallel with each of said impediments and including two of the tube electrodes; means for preventing electronic flow between said electrodes; and means for opening and closing said branch circuits.

4. A short circuit detector for thermionic tubes comprising means for heating the tube cathode; a testing circuit including a source of suitable current, a plurality of impediments to current flow and an indicator; means for establishing a branch circuit in parallel with each of said impediments and including two of the tube electrodes; means for maintaining the tube cathode positive with reference to the other electrodes and thereby preventing electronic flow between said electrodes; and means for opening and closing said branch circuits.

5. A short circuit detector for thermionic tubes having cathodes, plates and grids, comprising means for heating a tube cathode; a testing circuit including a source of suitable current, a plurality of impediments to current flow, and an indicator; means for establishing a branch circuit in parallel with one of said impediments and including the tube plate and grid; means for establishing a second branch circuit in parallel with another of said impediments and including the tube grid and cathode; means for preventing electronic flow between said electrodes; a plate circuit including a source of plate voltage, the tube plate, the tube cathode and the indicator in said testing circuit; a grid circuit including a source of grid voltage, the tube grid and the tube cathode; a two-throw switch arranged to open and close the plate-grid branch circuit and the plate circuit; and a two-throw switch arranged to open and close the cathode-grid branch circuit and the grid circuit.

6. A short circuit detector for thermionic tubes having cathodes, plates and grids, comprising means for heating a tube cathode; a testing circuit including a source of suitable current, a plurality of impediments to current flow, and an indicator; means for establishing a branch circuit in parallel with one of said impediments and including the tube plate and grid; means for establishing a second branch circuit in parallel with another of said impediments and including the tube grid and cathode; means for maintaining the tube cathode positive with reference to the other electrodes and thereby preventing electronic flow between said electrodes; a plate circuit including a source of plate voltage, the tube plate, the tube cathode and the indicator in said testing circuit; a grid circuit including a source of grid voltage, the tube grid and the tube cathode; a two-throw switch arranged to open and close the plate-grid branch circuit and the plate circuit; and a two-throw switch arranged to open and close the cathode grid branch circuit and the grid circuit.

HAROLD P. MANLY.